Nov. 10, 1970    G. C. DEWEY ET AL    3,540,052
APPARATUS FOR INDICATING THE BEARING OF A
VEHICLE RELATIVE TO A POINT
Filed March 7, 1968    5 Sheets-Sheet 1
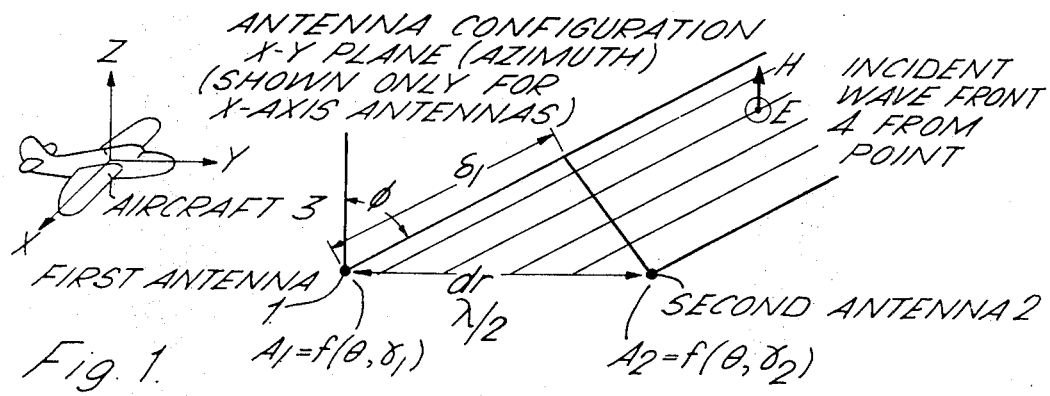
Fig. 1.
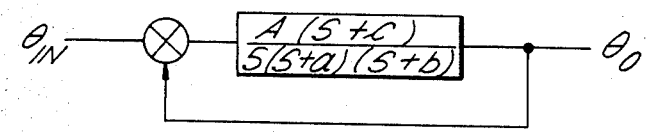
Fig. 6.
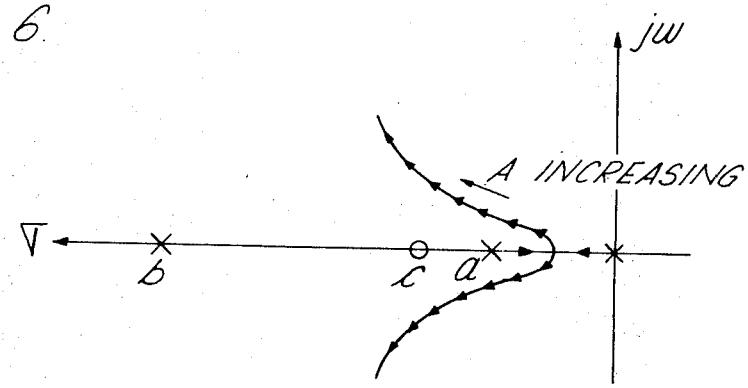
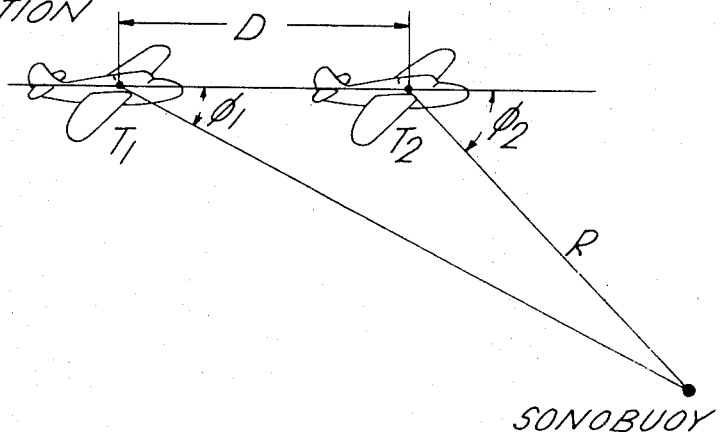
RANGE SOLUTION
Fig. 7
INVENTORS
GORDON C. DEWEY
NATHAN STERN
BY Nolte & Nolte
ATTORNEYS

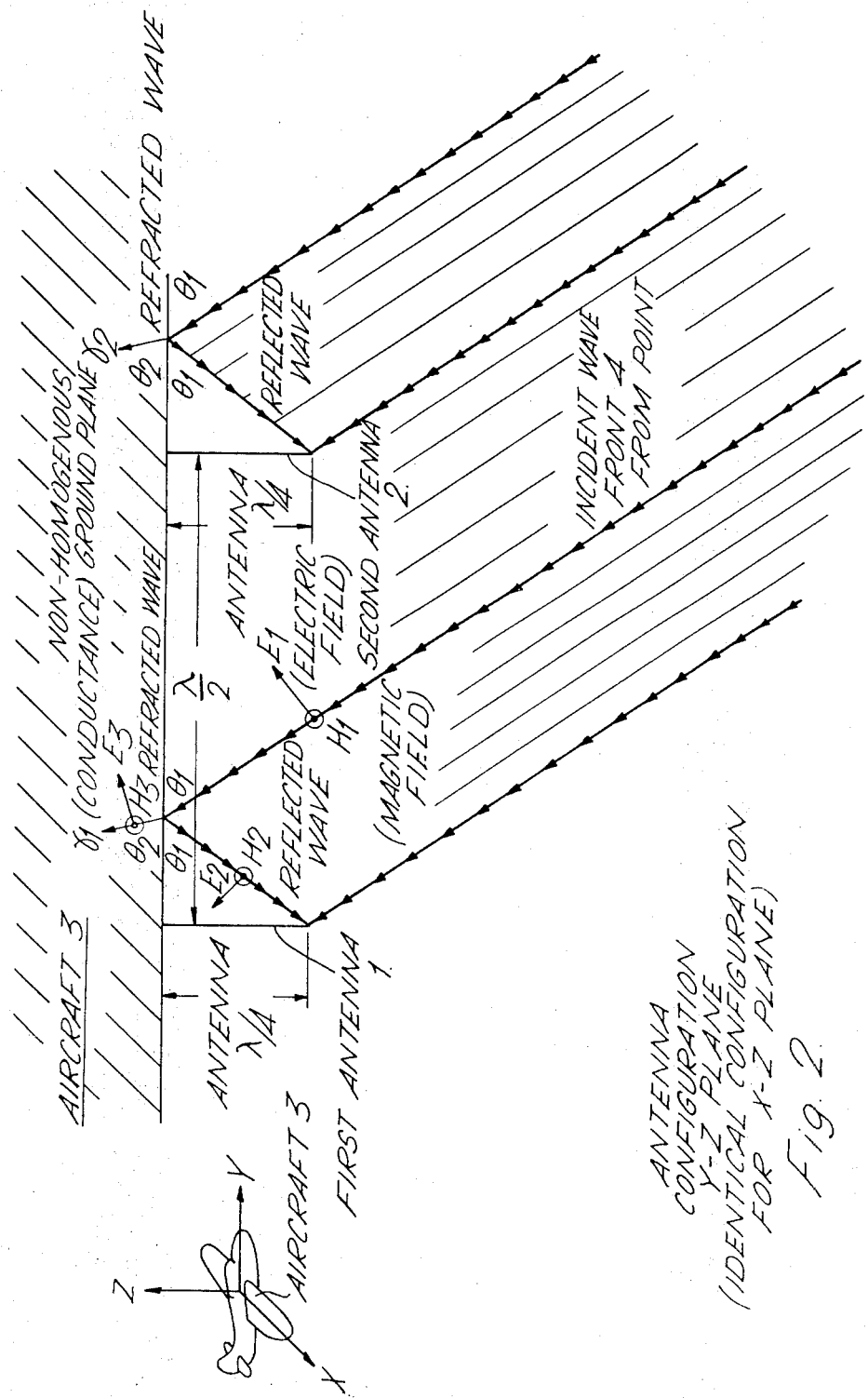

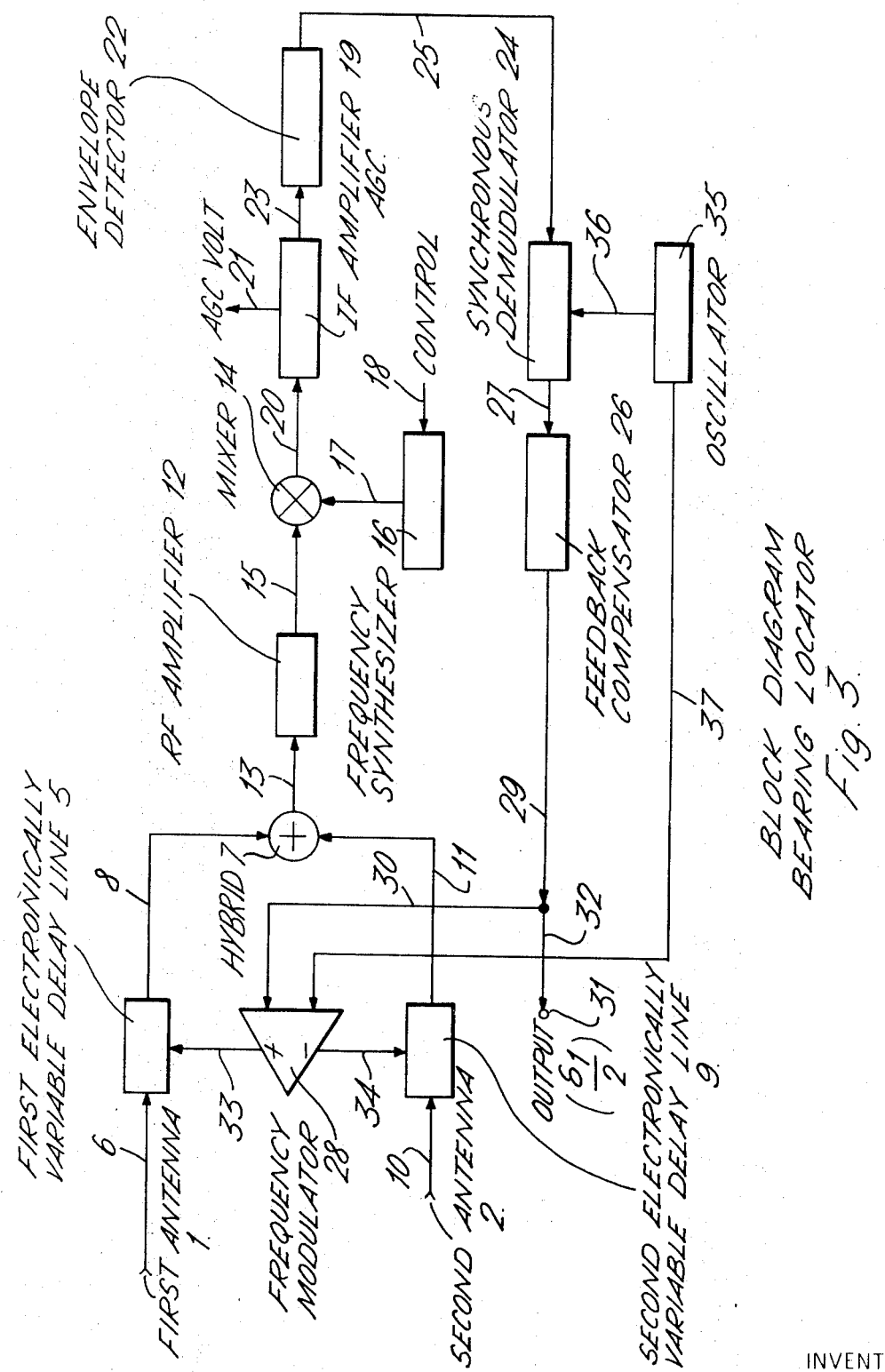

3,540,052
APPARATUS FOR INDICATING THE BEARING
OF A VEHICLE RELATIVE TO A POINT
Gordon C. Dewey, New York, and Nathan Stern, Brooklyn, N.Y., assignors to The G. C. Dewey Corporation,
New York, N.Y., a corporation of New York
Filed Mar. 7, 1968, Ser. No. 711,326
Int. Cl. G01s 3/46
U.S. Cl. 343—113                   12 Claims

ABSTRACT OF THE DISCLOSURE

The bearing of a vehicle relative to a transmission point is determined by the phase difference between a wave front impinging upon each of a pair of antennae mounted on the vehicle a predetermined distance apart.

BACKGROUND OF THE INVENTION

Field of the invention

The present invention relates to apparatus for indicating the bearing of a vehicle relative to a point. More particularly, the invention relates to apparatus for indicating the bearing of a vehicle such as, for example, an aircraft or a ship, relative to a sonobuoy or any other radiating source.

Description of the prior art

Apparatus of the prior art for indicating the bearing of a vehicle relative to a point may comprise a phase correlation system and utilizes at least sum and difference patterns which require at least two RF, IF channels, switch beam patterns or other techniques which require two RF and two IF channels.

SUMMARY OF THE INVENTION

The principal object of the present invention is to provide new and improved apparatus for indicating the bearing of a vehicle relative to a point. The apparatus of the present invention is especially suitable for indicating the bearing of an aircraft or sea going vessel relative to a sonobuoy or other radiating source. The apparatus of the present invention utilizes one sum pattern and one RF, IF channel as opposed to at least two RF, IF channels of known apparatus. The apparatus of the present invention utilizes omnidirectional antennae of the simplest type and provides an output which is an autocorrelation function having all the advantages of a phase correlation system. The apparatus of the present invention minimizes error in bearing determination. The apparatus of the present invention operates with near insensitivity to ground plane variations and to antenna gain variations. The apparatus of the present invention provides feedback stabilization and operates at negative signal-to-noise ratios. The apparatus of the present invention functions with precision, efficiency, effectiveness and reliability. The apparatus of the present invention is simple in structure and is economical in cost and operation.

In accordance with the present invention, apparatus for indicating the bearing of a vehicle and a point relative to each other, one of the vehicle and the point moving at a determined heading and velocity relative to the other of the vehicle and the point, comprises a transmitter at the point for radiating signals. A receiver is carried by the vehicle for receiving signals radiated by the transmitter. The receiver comprises first and second antennae spaced from each other and indicating means coupled to the antennae for indicating the time delay of an incident wave front between the first and second antennae. The wave front is radiated from the transmitter. The time delay corresponds to the relative bearing of the vehicle and the point. The indicating means includes an output providing a signal corresponding to the relative bearing of the vehicle and the point. The first and second antennae are spaced a predetermined distance from each other. The indicating means of the receiver comprises a single RF, IF channel, passive summing means and a phase nulling circuit.

The indicating means of the receiver comprises a modulator for time delay modulating the signals received by the first and second antennae at determined modulating delay times. Summing means algebraically adds the time delay modulated signals. A synchronous demodulator synchronously demodulates the output signal of the summing means with the modulating delay times to provide autocorrelation, the synchronous demodulator being connected to the output of the indicating means. The indicating means of the receiver comprises a first electronically variable delay line connected to the first antenna. A second electronically variable delay line is connected to the second antenna. The modulator has inputs and outputs connected to the first and second electronically variable delay lines for time delay modulating the signals received by the first and second antennae at determined modulating delay times. The summing means algebraically adds the time delay modulated signals from the first and second electronically variable delay lines. The synchronous demodulator has an input coupled to the summing means and an output connected to an input of the modulator for synchronously demodulating the output signal of the summing means, the output of the synchronous demodulator being connected to the input of the indicating means. The synchronous demodulator includes a matching filter.

The indicating means of the receiver comprises an RF amplifier having an output and an input connected to the summing means. A mixer has an input, an output and an input connected to the output of the RF amplifier. A determined frequency is supplied to the first-mentioned input of the mixer. Coupling means couples the output of the mixer to the input of the synchronous demodulator. The coupling means comprises an automatic gain control amplifier having an output and an input connected to the output of the mixer. An envelope detector has an input connected to the output of the automatic gain control amplifier and an output connected to the input of the synchronous demodulator. The indicating means of the receiver comprises an oscillator for supplying the determined modulating delay times to an input of the synchronous demodulator and to an input of the modulator.

The vehicle is an air, surface or sub-surface craft and the point is a sonobuoy in a body of water or any source of radiation on, beneath or above the surface of land or a body of water. The vehicle is moving relative to the sonobuoy or other radiating source.

BRIEF DESCRIPTION OF THE DRAWINGS

In order that the present invention may be readily carried into effect, it will now be described with reference to the accompanying drawings, wherein:

FIG. 1 is a schematic diagram of the antennae configuration of the receiver of the apparatus of present invention;

FIG. 2 is a schematic diagram, in another plane and in greater detail, of the antennae configuration of the receiver of the apparatus of the present invention;

FIG. 3 is a block diagram of an embodiment of the apparatus of the present invention;

FIG. 6 is a graphical presentation of the root locus of the closed loop characteristic of the feedback compensator of the apparatus of FIG. 3;

FIG. 7 is a schematic diagram illustrating the determination of the range.

DESCRIPTION OF THE PREFERRED EMBODIMENT

Figure 4:
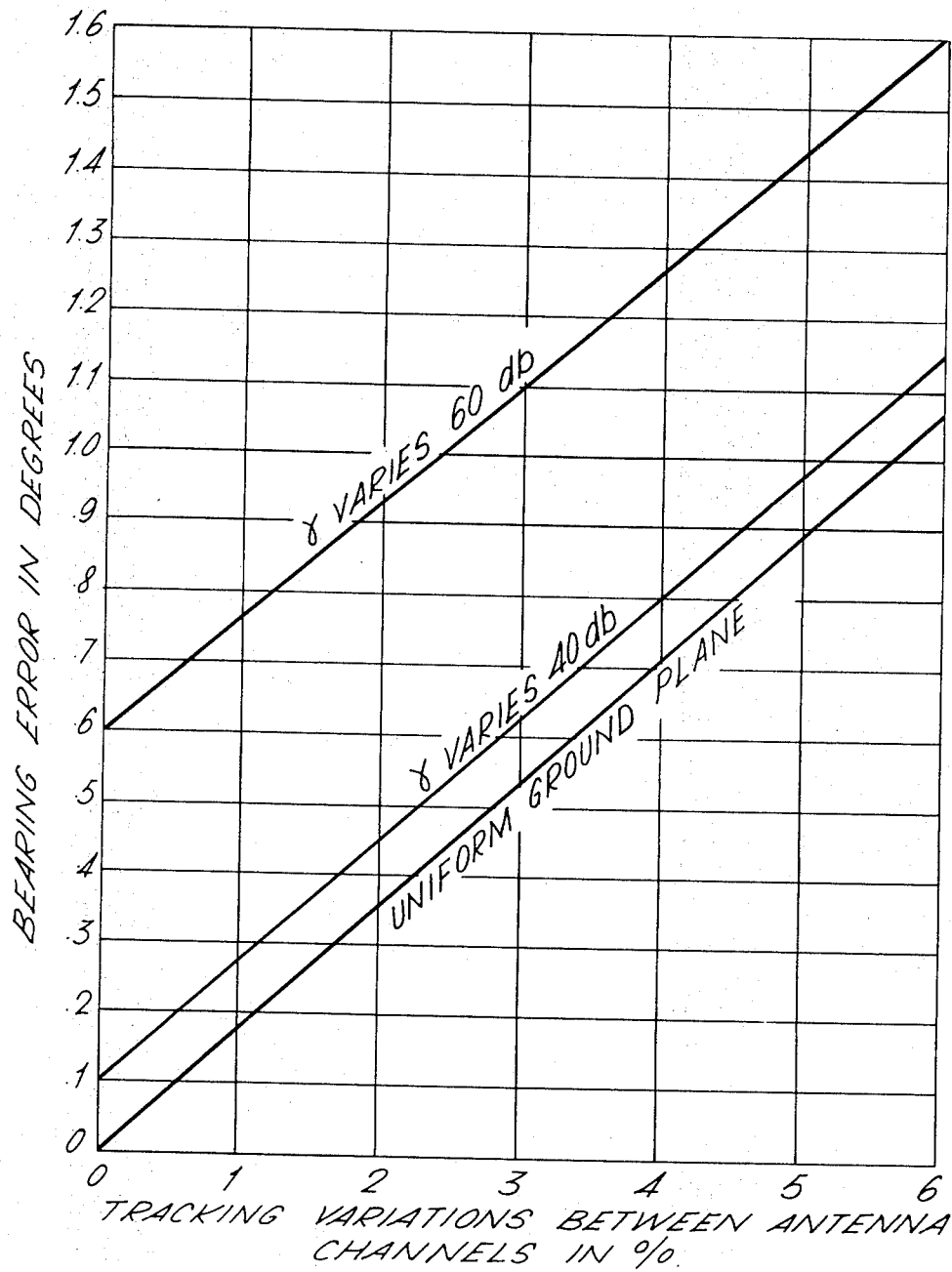
FIG. 4 is a graphical presentation of bearing error versus ground plane variations and internal antenna variations.

In FIGS. 1 and 2, a first antenna 1 and a second antenna 2 are positioned a half wavelength from each other. In accordance with the present invention, the bearing of a vehicle such as, for example, an aircraft or sea going vessel 3, upon which the antennae 1 and 2 are mounted is determined relative to a point, not shown in FIGS. 1 and 2, which transmits a wave front. The bearing of the aircraft 3 relative to the point corresponds to the time delay of the incident wave front between the first and second antennae 1 and 2. The point (not shown in FIGS. 1 and 2) may comprise a sonobuoy, or any suitable radiating source or point when the radiating source is a source of acoustic energy, the antennae 1 and 2 are, of course, in the form of suitable acoustic transducers, which may be conventional pressure sensitive transducers such as hydrophones.

Each of FIGS. 1 and 2 discloses the antenna congfiuration for the X axis antennae, since, in order to provide omnidirectional coverage in the X, Y azimuth plane, two pairs of antennae are utilized. In each of FIGS. 1 and 2, the first antenna 1 is a quarter wave stub antenna mounted along the X axis and the second antenna is a quarter wave stub antenna mounted along the X axis. The third and fourth antennae, mounted along the Y axis, are not shown in FIGS. 1 and 2.

In each of FIGS. 1 and 2, $\phi$ is the relative azimuth bearing, $\delta$ is the phase delay due to $\phi$, $\gamma$ is the ground plane conductance, $\lambda$ is the wavelength and $\theta$ is the declination angle. The desired bearing angle $\phi$ is measured relative to the Y axis. The antennae 1 and 2 are vertically polarized; that is, the magnetic field vector of each antenna is parallel to the antenna.

The gain and phase characteristic of the antennae are functions of bearing angle, declination angle and ground plane impedance. The antenna pattern derivation is as follows:

At the boundary of the ground plane, the tangential components of the electric field E (FIGS. 1 and 2) and the magnetic field H (FIGS. 1 and 2) must be continuous. That is, (1) $\quad H_1 + H_2 = H_3$ (2) $\quad E_{T_1} + E_{T_2} = E_{T_3}$ wherein $E_{T_1} = P_1 H_1$; $E_{T_2} = P_1 M_2$; $E_{T_3} = P_2 H_3$; and P is the wave impedance. Geometrically, however, $$\frac{E_{T_1}}{\sin \theta_1} = P_1 H_1$$

$$\frac{-E_{T_2}}{\sin \theta_1} = P_1 H_1$$

$$\frac{E_{T_3}}{\sin \theta_2} = P_2 H_3$$

Equation 1 thus becomes $$\frac{E_{T_1}}{P_1 \sin \theta_1} - \frac{E_{T_2}}{P_1 \sin \theta_1} = \frac{E_{T_3}}{P_2 \sin \theta_2}$$

From Equation 2, $$\frac{E_{T_1}}{P_1 \sin \theta_1} - \frac{E_{T_2}}{P_1 \sin \theta_1} = \frac{E_{T_1} + E_{T_2}}{P_2 \sin \theta_2}$$

(3)

$$E_{T_1}(P_2 \sin \theta_2 - P_1 \sin \theta_1) = E_{T_2}(P_1 \sin \theta_1 + P_2 \sin \theta_2)$$

$$\frac{E_{T_2}}{E_{T_1}} = \frac{P_2 \sin \theta_2 - P_1 \sin \theta_1}{P_2 \sin \theta_2 + P_1 \sin \theta_1}$$

In a perfect ground plane, $$P_2 = 0 \text{ and } \frac{E_{T_2}}{E_{T_1}} = -1$$

There is an ideal condition, in which the incident wave is completely reflected. The antenna pattern may be derived in such case by replacing the ground plane with an exact image antenna.

When the ground plane is not perfect, the incident wave is not completely reflected and a phase shift is introduced into the reflected wave which is related to frequency and the conductance of the ground plane.

The wave impedance $P_2$ of a conducting medium is $$P_2 = \frac{E}{H} = (1-j)\sqrt{\frac{\pi F \mu}{\gamma}}$$

The wave impedance $P_1$ of air is $$P_1 = \sqrt{\frac{\mu}{e}} = 377 \text{ ohms.}$$

The amplitude and phase characteristics of a wave reflected by an imperfect ground plane are derived from Equation 3. Snell's law, which is where $V_1$ is the wave velocity in air and is equal to $3 \times 10^8$ meters per second and $$V_2 = 2\sqrt{\frac{\pi F}{\mu \gamma}}$$

is utilized to evaluate $\sin \theta_2$. If it is assumed that $$A = \sqrt{\frac{\pi F \mu}{\gamma}} \text{ and } \frac{V_2}{V_1} = B$$

Equation 3 becomes $$\frac{E_{t_2}}{E_{t_2}} = \frac{(1+j)A\sqrt{1-B^2 \cos^2 \theta_1} - P_1 \sin \theta_1}{(1+j)A\sqrt{1-B^2 \cos^2 \theta_1} + P_2 \sin \theta_1}$$

$$= \frac{A(1-B^2 \cos^2 \theta_1)^{1/2} - P_1 \sin \theta_1 + jA(1-B^2 \cos^2 \theta_1)^{1/2}}{A(1-B^2 \cos^2 \theta_1)^{1/2} + P_1 \sin \theta_1 + jA(1-B^2 \cos^2 \theta_1)}$$

If the foregoing equation is divided by $A(1-B^2 \cos^2 \theta_1)$, $$\frac{E_{t_2}}{E_{t_1}} = \frac{1 - \frac{P_1 \sin \theta_1}{A(1-B^2 \cos^2 \theta_1)^{1/2}} + j}{1 + \frac{P_1 \sin \theta_1}{A(1-B^2 \cos^2 \theta_1)^{1/2}} + j}$$

The magnitude M of the reflected wave is then $$M = \frac{\left[\left(1 - \frac{P_1 \sin \theta_1}{A(1-B^2 \cos^2 \theta_1)^{1/2}}\right)^2 + 1\right]^{1/2}}{\left[\left(1 + \frac{P_1 \sin \theta_1}{A(1-B^2 \cos^2 \theta_1)^{1/2}}\right)^2 + 1\right]^{1/2}}$$

The phase angle of the reflected wave $\delta_2$ is $$\delta_2 = \frac{\tan^{-1}}{1-\frac{P_1 \sin\theta_1}{A(1-B^2\cos^2\theta_1)^{1/2}}} - \frac{\tan^{-1}}{1+\frac{P_1 \sin\theta_1}{A(1-B^2\cos^2\theta_1)^{1/2}}}$$

The antenna pattern is then derived by considering an image antenna with an amplitude attenuation and a phase shift with respect to the actual antenna. If the antennae are initially considered as isotropic point sources having unequal amplitudes and phases, and if $$\frac{E_{T_2}}{E_{T_1}} = a = \text{ratio of antenna gains}$$

$\delta_2$ = phase shift between two antennae.

The nomalized antenna response to an incident wave is then $$\sqrt{(+a\cos\psi)^2 + a^2\sin^2\psi}$$

where $$\psi = \frac{\pi}{2}\cos\theta + \delta_2$$

The complete pattern is determined by multiplying the isotropic source by the actual source pattern, which is approximately that of a short vertically polarized dipole. The complete normalized antenna pattern is $$\cos\theta\sqrt{(1+a\cos\psi)^2 + a^2\sin^2\psi}$$

The accuracy of the bearing measurement is a function of the amplitude and phase variations between two antennae. Phase and amplitude differences between two antennae are determined from the following conditions.

(A) Declination angle $\theta$ of 45°
(B) Ground plane impedance variation between antennae of 20, 40, 60 and 80 db
(C) Aluminum ground plane having ideal conductance $\delta$ equal to (3.55) $10^7$ mhos per meter
(D) Wave impedance of air $P_1$ equal to 377 ohms
(E) Permeability of ground plane equal to permeability of air equal to $(4\pi)\, 10^{-7}$
(F) Wave velocity in air $V^1$ equal to $3\times 10^8$ meters per second
(G) Frequency of 160 megacycles per second The values of $a$ and $\delta$ for various values of ground plane conductance $\gamma$ are indicated in Table I.

TABLE I

| Variation in conductance $\gamma$ | Ratio $a$ of antenna gains | Phase shift $\gamma^2$ between two antennae |
|---|---|---|
| Conductance L: | | |
| 3.55×10⁷ | None | ≈1 | <1° |
| 3.55×10⁵ | 100 to 1 | ≈1 | 1° |
| 3.55×10⁴ | 1,000 to 1 | ≈1 | 6° |
| 3.55×10³ | 10,000 to 1 | 0.9997 | 12° |

The relation between the bearing angle $\phi$ and the wave front delay $\delta_1$ between antennae, by geometry, $$\delta = dr \sin\phi \text{ or } \delta_1 = \pi \sin\phi$$

for a spacing of half a wavelength. The wave front delay $\delta_1$ is determined by the apparatus of the present invention, as shown in FIG. 3.

In FIG. 3, the first antenna 1 is connected to an input of a first electronically variable delay line 5 via lead 6. The output of the first electronically variable delay line 5 is connected to a first input of a hybrid 7 via a lead 8. The second antenna 2 is connected to an input of a second electronically variable delay line 9 via a lead 10. The output of the second electronically variable delay line 9 is connected to a second input of the hybrid 7 via a lead 11. The output of the hybrid 7 is connected to the input of an RF amplifier 12 via a lead 13. The output of the RF amplifier 12 is connected to a first input of a mixer 14 via a lead 15. A frequency synthesizer 16 has an output connected to a second input of the mixer 14 via a lead 17. A control signal from any suitable source of control is supplied to the input of the frequency synthesizer via a lead 18 to select a desired frequency to be supplied to the mixer 14.

The output of the mixer 14 is connected to the input of an IF amplifier 19 via a lead 20. The IF amplifier 19 provides an AGC voltage at one output via a lead 21. A second output of the IF amplifier 19 is connected to the input of an envelope detector 22 via a lead 23. The output of the envelope detector 22 is connected to an input of a synchronous demodulator 24 via a lead 25.

The output of the synchronous demodulator 24 is connected to the input of a feedback compensator 26 via a lead 27. The output of the feedback compensator 26 is connected to a first input of a time delay modulator 28 via leads 29 and 30. The output of the feedback compensator 26 is connected to an output terminal 31 via the lead 29 and a lead 32. A first output of the time delay modulator 28 is connected to another input of the first electronically variable delay line 5 via a lead 33 to vary the delay time of said delay line. A second output of the time delay modulator 28 is connected to another input of the second electronically variable delay line 9 via a lead 34 to vary the delay time of said delay line.

An oscillator 35 has a first output connected to another input of the synchronous demodulator 24 via a lead 36 and a second output connected to a second input of the time delay modulator 28 via a lead 37. The oscillator 35 produces the modulating delay times $\omega_m$ and supplies such delay times to each of the synchronous demodulator 24 and the time delay modulator 28.

In FIG. 3, the signal transmitted from a point such as, for example, the signal transmitted from a sonobuoy, is received by the first and second antennae 1 and 2 and is modulated by the time delay modulator 28 in the first electronically variable delay line 5 and in the second electronically variable delay line 9. Each of the first and second electronically variable delay lines 5 and 9 may comprise any suitable electronically variable delay line. A varactor is preferably used as each of the first and second delay lines 5 and 9. A varactor is a semiconductor diode designed to maximize the variation of its capacitance with applied voltage and is often simply called a variable-capacitance diode and may be either the junction or point contact type.

The delay time modulated sonobuoy signals are added algebraically in the hybrid 7 which may comprise any suitable RF transformer. The time delay modulator 28 may comprise any suitable time delay modulator. The hybrid 7 produces a sum pattern which is amplified at its RF by the RF amplifier 12. The frequency synthesizer 16 provides a desired frequency which is mixed with the amplified RF in the mixer 14, which provides an IF of 30 megacycles per second. The frequency synthesizer 16 may comprise any suitable frequency synthesizer, the RF amplifier 12 may comprise any suitable RF amplifier and the mixer 14 may comprise any suitable mixer.

The IF is amplified by the IF amplifier 19, which may comprise any suitable IF amplifier, and is envelope detected by the envelope detector 22, which may comprise any suitable envelope detector. After the IF is envelope detected, it is synchronously demodulated with the modulation delay times at which the sonobuoy signals are modulated. The envelope detected IF is synchronously demodulated in the synchronous demodulator 24, which may comprise any suitable synchronous demodulator.

The synchronously demodulated, envelope detected IF is integrated in the feedback compensator 26, which may comprise any suitable integrator, and provides an output of half the phase delay between the signals received from the sonobuoy by the antennae 1 and 2, or $\delta_1/2$. The integrated signal is also fed back to the first and second electronically variable delay lines 5 and 9 via the time delay modulator 28, which includes a differential input-output amplifier. The differential input-output amplifier may comprise any suitable differential amplifier.

The sonobuoy signal received by the first antenna 1 is supplied to the first electronically variable delay line 5 as $$F_1(t) = A_1 \cos(\omega_0 t + \delta_1 + \delta_{27})$$

and the sonobuoy signal received by the second antenna 2 is supplied to the second electronically variable delay line 9 as $$F_2(t) = A_2 \cos \omega_0 t$$

wherein $A_1$ is the gain of the first antenna 1, $A_2$ is the gain of the second antenna 2, $\omega_0$ is the frequency of the sonobuoy signal, $\delta_1$ is the phase delay $f(\theta)$ due to the bearing angle $\phi$, and $\delta_2$ is the phase delay $f(\gamma)$ due to the ground plane. The bearing angle is $\phi$, the ground plane conductance is $\gamma$, the modulation index is $K_m$, the modulation delay time is $\omega_m$, and the phase delay of an electronically variable delay line is $\delta_3$.

After time delay moduation in the first electronically variable delay line 5, $$F_1(t) = A_1 \cos(\omega_0 t + K_m \sin \omega_m t + \delta)$$

where $\delta$ equals $\delta_1 + \delta_2 + \delta_3$. After time delay modulation in the second electronically variable delay line 9, $$F_1(t) = A_1 \cos(\omega_0 t + K_m \sin \omega_m t + \delta)$$

and $$F_1(t) + F_2(t) = A_1 \cos(\omega_0 t + K_m \sin \omega_m t + \delta) + A_2 \cos(\omega_0 t - K_m \sin \omega_m t)$$

If $F_1(t) + F_2(t)$ is expanded in a Fourier expansion, the function obtained is $A_1 \cos(\omega_0 t + \delta)[J_0(K_m) + 2[J_2(K_m) \cos 2\omega_m t$
$+ J_4(K_m) \cos 4\omega_m t + \ldots ]]$
$+ A_2 \cos \omega_0 t [J_0(K_m) + 2[J_2(K_m) \cos 2\omega_m t$
$+ J_4(K_m) \cos 4\omega_m t + \ldots ]]$
$+ 2A_2 \sin \omega_0 t [J_1(K_m) \sin \omega_m t$
$+ J_3(K_m \sin 3\omega_m t + \ldots ]$
$- 2A_1 \sin(\omega_0 t + \delta)[J_1(K_m) \sin \omega_m t$
$+ J_3(K_m) \sin 3\omega_m t + \ldots ]$ where $J_0, J_1, J_2, J_3, J_4 \ldots$ are Bessel function coefficients.

If all the terms except those including $\sin \omega_m t$ are temporarily overlooked, $F_1(t) + F_2(t)$ is reduced to $$2J_1(K_m)[A_2 \sin \omega_0 t - A_1 \sin(\omega_0 t + \delta)] \sin \omega_m t$$

since $\delta = \delta_1$ and $A_2 = A_1$ under ideal conditions, $$F_1(t) + F_2(t) = 2A_1 J_1(k_m) [\sin \omega_0 t - \sin(\omega_0 t + \delta)] \sin \omega_m t = 4A_1 J_1(k_m) \sin\left(\frac{\delta}{2}\right)\left[\cos\left(\omega_0 t + \frac{\delta}{2}\right)\right] \sin \omega_m t$$

After envelope detection, $$F_1(t) + F_2(t) = 4A_1 J_1(k_m) \sin\left(\frac{\delta}{2}\right) \sin \omega_m t$$

After synchronous demodulation $$F_1(t) + F_2(t) = -4A_1 J_1(k_m) \left[\sin\frac{\delta}{2}\right] \frac{2}{\pi} \left[1 + \frac{2}{3} \cos 2\omega_m t + \frac{2}{15} \cos 4\omega_m t + \ldots \right]$$

The synchronous demodulator 24 thus validates the overlooking of all the terms in $F_1(t) + F_2(t)$ except $\sin \omega_m t$. The demodulator 24 in essence chops the sum signal produced by the mixer 14 at the modulating delay times thereby completely eliminating all the even harmonic inputs. The odd harmonics generate DC and even harmonic terms at the output of the demodulator 24 with the fundamental modulating delay times providing the most significant term.

The synchronous demodulator 24 includes a matched filter of any suitable type. The filtered demodulator output is $$F_1(t) + F_2(t) = -\frac{8}{\pi} A_1 J_1(k_m) \sin \frac{\delta}{2}$$

After demodulation and filtering, the sum signal is integrated and fed back regeneratively until the sum signal is reduced to zero. Since the initial sum signal $$F_1(t) + F_2(t)$$

is $F_1(t) + F_2(t) = 2J_1(k_m)[\sin \omega_0 t - \sin \omega_0 t + \delta] \sin \omega_m t, F_1(t)$
$+ F_2(t) = $zero, when $\delta$ equals zero. Thus, $\frac{\delta_1}{2} = \delta_3$.

In summary, under ideal conditions, the output of the time of arrival detector or apparatus of the present invention is equal to $\delta_1$, where $\delta_1$ equal $\pi \sin \phi$.

The modulating signal supplied by the time delay modulator 28 to the first delay line 5 is $$k_m \sin \omega_m t + \frac{\delta_3}{2}$$

and the modulating signal supplied by said time delay modulator to the second delay line 9 is $$-k_m \sin \omega_m t - \frac{\delta_3}{2}$$

FIG. 4 discloses bearing error versus ground plane variations and internal antenna variations. The sensitivity to amplitude and phase errors are included by determining the error for the case in which $$\delta_1 = 0 \quad \delta_2 = 0 \quad A_1 \neq A_2$$

The sum pattern for the $\sin \omega_m t$ terms becomes $$F_1(t) + F_2(t) = 2J_1(K_m)[(A_2 - A_1) \sin \omega_m t] \sin \omega_m t$$

After envelope detection, the sum pattern becomes $$F_1(t) + F_2(t) = 2J_1(K_m)(A_2 - A_1) \sin \omega_m t$$

After synchronous demodulation and filtering, the sum pattern becomes $$F_1(t) + F_2(t) = 4/\pi J_1(K_m)(A_2 - A_1)$$

The effect of the amplitude and phase errors is determined by equating the ideal output term with the output error term, so that $$-\frac{8A_1 J_1(k_m)}{\pi} \sin \frac{\delta}{2} \text{(ideal term)}$$
$$= \frac{4}{\pi} J_1(k_m)(A_2 - A_1) \text{(error term)}$$

This reduces to $$-2 \sin \frac{\delta}{2} = \frac{A_2}{A_1} - 1$$

$$2 \sin \frac{\delta}{2} = 1 - \frac{A_2}{A_1}$$

The phase error due to amplitude is $$\delta_A = 2 \sin^{-1}\left[\frac{1}{2}\left(1 - \frac{A_2}{A_1}\right)\right]$$

$$\delta_A = \pi \sin \phi_A$$

so that $$\phi_A = \pi \sin^{-1}\left[\frac{2}{\pi} \sin^{-1}\frac{1}{2}\left(1 - \frac{A_2}{A_1}\right)\right]$$

The phase error due to $\delta_2$ is $$\phi_{\delta_2} = \sin^{-1}\frac{\delta_2}{\pi}$$

The total error for phase and amplitude errors is $$\phi_T = \sin^{-1}\left[\frac{2}{\pi} \sin^{-1}\left[\frac{1}{2}\left(1 - \frac{A_2}{A_1}\right)\right]\right] + \sin^{-1}\frac{\delta_2}{\pi}$$

The synchronous demodulator 24 and its matched output filter define an autocorrelator. The autocorrelator provides an optimum response for noise inputs. The noise output voltage of an autocorrelator has a zero DC value with a sinusoidal component or variance whose amplitude is a function of the averaging network time constant.

Figure 5:
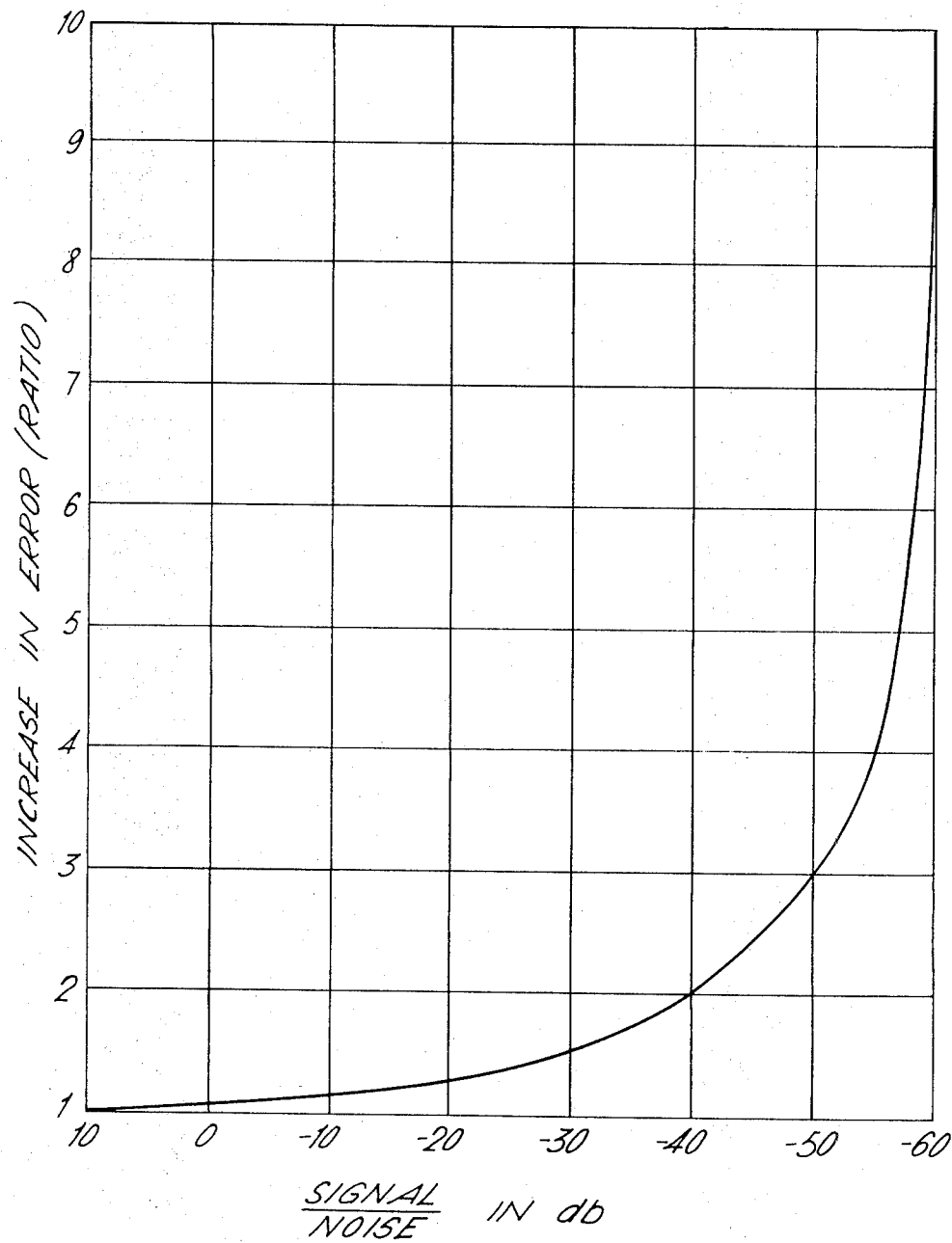
FIG. 5 is a graphical presentation of increase in error due to signal-to-noise ratio at the input to the synchronous demodulator of the apparatus of FIG. 3.

FIG. 5 discloses the increase in error due to signal-to-noise ratio at the input to the synchronous demodulator 24 of FIG. 3. The signal-to-noise improvement provided by an autocorrelator is proportional to the ratio of the input and output bandwidths. An improvement of 40db is provided by the apparatus of the present invention. Bearing errors are introduced at low signal-to-noise ratios. Noise changes the gain of the feedback loop, thereby reducing its sensitivity.

In a linear system, bearing measurement may be determined accurately at a signal-to-noise ratio of −40 db. Practical limitations of RF and IF amplifiers such as, for example, noise levels, nonlinearities, threshold levels, and the like, limit the required minimum level of signal-to-noise. Actual flight test results have demonstrated satisfactory operation of the apparatus of the present invention down to a signal-to-noise level of −10 db.

The satisfactory operation of the time-of-arrival bearing measurement is maintained over a wide dynamic range. Under normal operating conditions, the AGC amplifier 19 (FIG. 3) provides a constant loop gain. The AGC amplifier 19 has a linear dynamic range of 60 db. When the AGC amplifier 19 exceeds its linear range, the gain of the closed loop varies.

FIG. 6 discloses the root locus of the closed loop characteristic of the feedback compensator 26 of FIG. 3. The lead-lag compensation network or compensator 26 (FIG. 3) is utilized in the feedback loop. The feedback loop is inherently stable, since the poles are always in the left half plane, and also functions as an adaptive noise filter. As the signal-to-noise ratio decreases, the gain of the loop decreases, so that the loop time constant increases, thereby decreasing the noise variance.

The feedback compensation provided by the feedback compensator 26 of FIG. 3 is $$\frac{A(S+c)}{S(S+a)(S+b)}$$

Wherein A is the loop gain and S equals $\nabla + j\omega$; $\nabla$ being the abscissa of FIG. 6 and $j\omega$ being the ordinate of FIG. 6.

The range may be determined by the use of a computer with the apparatus of the invention.

While the invention has been described by means of specific examples and in a specific embodiment, we do not wish to be limited thereto, for obvious modifications will occur to those skilled in the art without departing from the spirit and scope of the invention.

What we claim is:

1. Apparatus for indicating the bearing of a vehicle and a point relative to each other, one of said vehicle and said point moving at a determined heading and velocity relative to the other of said vehicle and said point, said apparatus comprising transmitter means at said point for radiating signals; and receiver means carried by said vehicle for receiving signals radiated by said transmitter means, said receiver means comprising first and second antennae spaced from each other and indicating means coupled to said antennae for indicating the time delay of an incident wave front between said first and second antennae, said wave front being radiated from said transmitter means, said time delay corresponding to the relatvie bearing of said vehicle and said point, said indicating means including an output providing a signal corresponding to the relative bearing of said vehicle and said point, said indicating means of said receiver means comprising a first electronically variable delay line connected to said first antenna, a second electronically variable delay line connected to said second antenna, modulating means having inputs and outputs connected to said first and second electronically variable delay lines for time delay modulating the signals received by said first and second antennae at determined modulating frequency, summing means for algebraically adding the time delay modulating signals from said first and second electronically variable delay lines, and synchronous demodulating means having an input coupled to said summing means and an output connected to an input of said modulating means for synchronously demodulating the output signal of said summing means, the output of said synchronously demodulating means being connected to the output of said indicating means.

2. Apparatus as claimed in claim 1, wherein the indicating means of said receiver means comprises RF amplifier means having an output and an input connected to said summing means, mixer means having an input, an output and an input connected to the output of said RF amplifier means, means for supplying a determined frequency to the first-mentioned input of said mixer means, and coupling means coupling the output of said mixer means to the input of said synchronous demodulating means.

3. Apparatus as claimed in claim 2, wherein said coupling means comprises automatic gain control amplifying means having an output and an input connected to the output of said mixer means and envelope detecting means having an input connected to the output of said automatic gam control amplifying means and an output connected to the input of said synchronous demodulating means.

4. Apparatus as claimed in claim 3, wherein the indicating means of said receiver means comprises means for supplying said determined modulating delay times to an input of said synchronous demodulating means and to an input of said modulating means.

5. An apparatus for producing a signal corresponding to the bearing of a source of radiation with respect to said apparatus, said apparatus comprising first and second spaced apart means for receiving said radiation and producing first and second electrical signals respectively corresponding thereto, a source of oscillations, time modulating means connected to modulate a phase characteristic of said first and second signals with said oscillations in phase opposition, means for algebraically summing said first and second modulated signals, and means for synchronously demodulating the output of said summing means at the frequency of oscillations to produce an output signal corresponding to said bearing.

6. The apparatus of claim 5 further comprising phase nulling circuit means whereby said apparatus functions as a null detector utilizing a single sum pattern, for maximizing signal to noise ratio of measurements by said apparatus.

7. The apparatus of claim 5 further comprising a feed back compensating means, and means connecting said feed back compensating means between said demodulating means and said modulating means, whereby the output of said compensating means corresponds to said bearing.

8. The apparatus of claim 5 further comprising means for envelope detecting the output of said adding means before application to said synchronously demodulating means.

9. The apparatus of claim 5 for receiving acoustic signals, wherein said first and second spaced apart means for receiving radiation comprise first and second acoustic transducing means respectively.

10. The apparatus of claim 5 for receiving electromagnetic radiation, wherein said first and second means for receiving said radiation comprise first and second radio antennae respectively.

11. The apparatus of claim 5 wherein said modulating means comprises first and second electronically variable delay line means connected to modulate said first and second signals respectively.

12. The apparatus of claim 11 further comprising feed back compensating means, and means connecting said feed back compensating means between said demodulating means and said modulating means.

References Cited

UNITED STATES PATENTS

| | | | |
|---|---|---|---|
| 2,449,553 | 9/1948 | Hansel | 343—121 |
| 2,166,991 | 7/1939 | Guanella. | |
| 3,137,851 | 6/1964 | Kirby et al. | 343—113 XR |
| 3,138,800 | 6/1964 | Speller. | |
| 3,221,251 | 11/1965 | Margerum et al. | |
| 3,328,794 | 6/1967 | Baltzer | 343—113 XR |

RODNEY D. BENNETT, Primary Examiner

R. E. BERGER, Assistant Examiner

U.S. Cl. X.R.

340—16; 343—117